Dec. 19, 1933.  W. N. HERROLD  1,940,054
LIGHT SUPPORT
Original Filed April 5, 1928  2 Sheets-Sheet 1
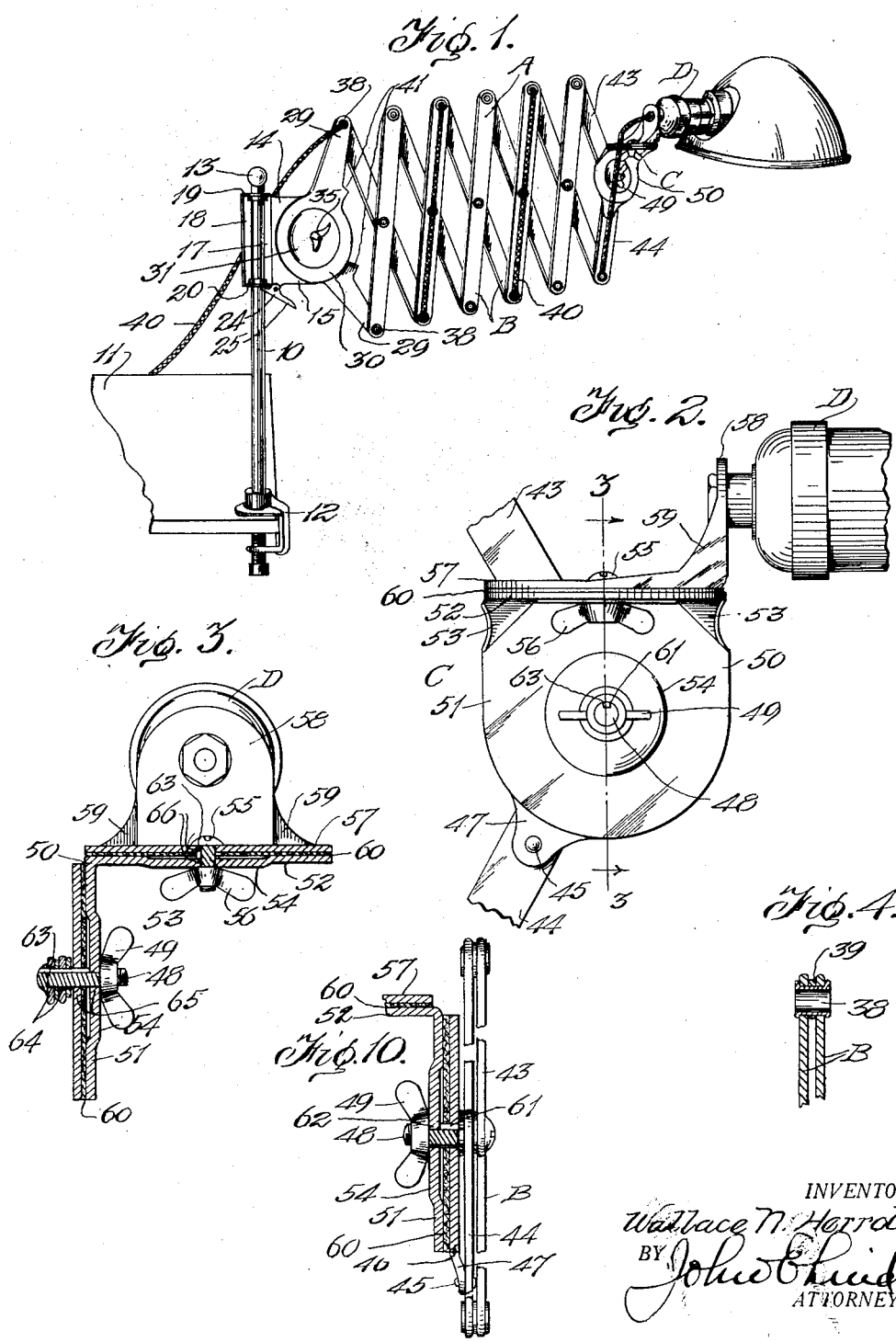
INVENTOR.
Wallace N. Herrold,
BY
ATTORNEYS.

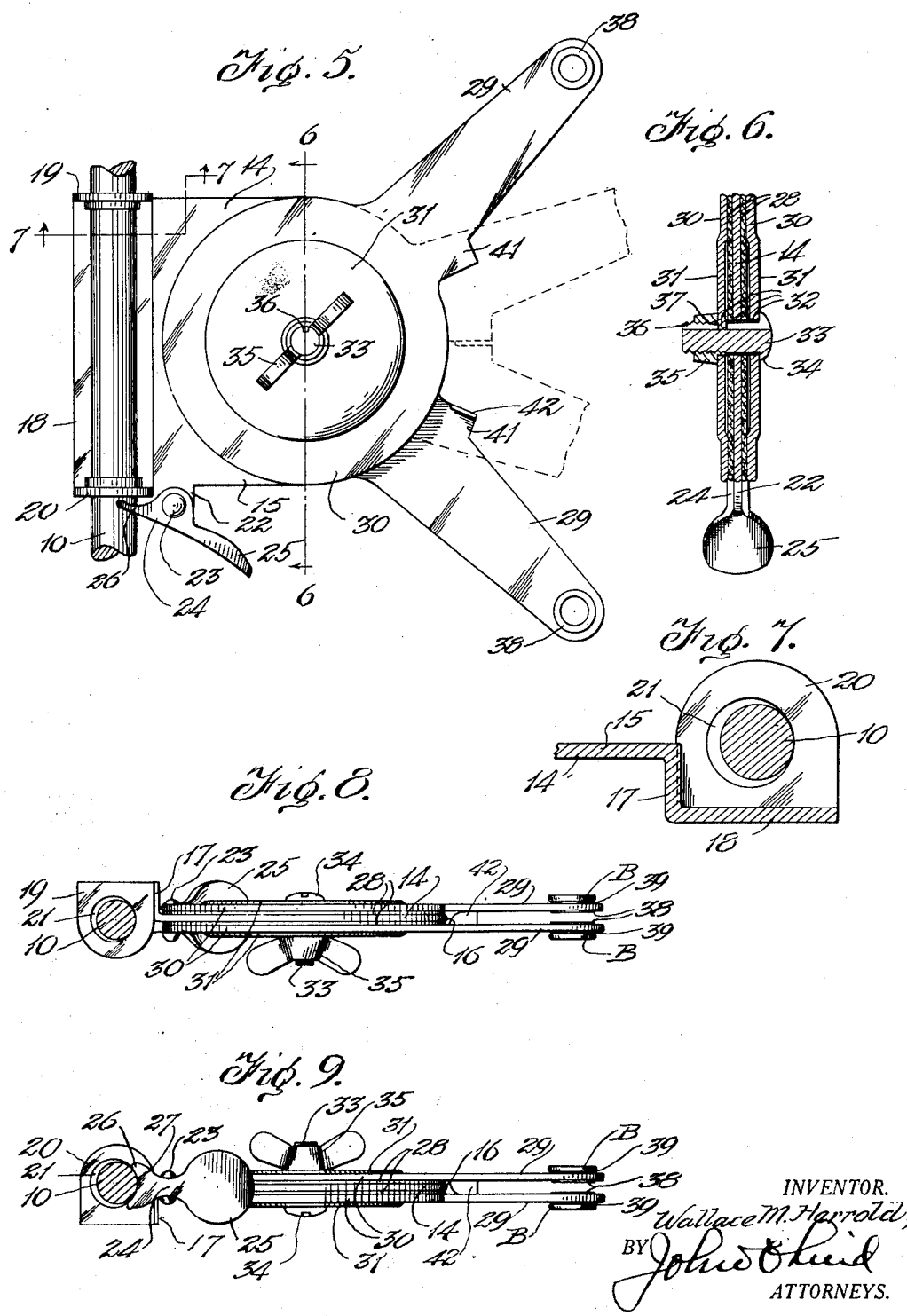

Patented Dec. 19, 1933

1,940,054

UNITED STATES PATENT OFFICE 1,940,054

LIGHT SUPPORT

Wallace N. Herrold, Richmond Hill, N. Y.

Application April 5, 1928, Serial No. 267,636
Renewed May 13, 1933

7 Claims. (Cl. 248—1)

This invention relates to a support for electric lights and has for its main object to provide a support which is extensible and which is so mounted that the light can be adjusted universally.

A further object of my invention is to provide a support that can be adjusted to any desired position and held there by friction alone.

A still further object of the invention is to provide a locking device upon the support which prevents longitudinal movement along a supporting bar but at the same time permits rotary movement around said supporting bar.

It is a still further object to so construct all the elements of my device so that they can easily be stamped out by means of dies and thereby cheapen the entire cost of the support.

With these and other objects in view as will hereinafter appear, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my improved light support;

Figure 2 shows a side elevational view of the universal joint provided adjacent the light socket;

Figure 3 is a cross sectional view taken on the section lines 3—3 of Figure 2;

Figure 4 is a sectional view of the pivot used between the elements of the lazytongs;

Figure 5 is an elevational view of the friction pivot for the lazytongs adjacent the supporting rod and the resilient latch whereby the lazytongs is supported from the supporting bar;

Figure 6 is a cross sectional view of the frictional pivot taken on the section lines 6—6 of Figure 5;

Figure 7 is a cross sectional view on the section lines 7—7 of Figure 5 showing the method of constructing the resilient feature in the holding plate which supports the lazytongs.

Figure 8 is a part sectional and part plan view of the frictional pivot and the holding latch;

Figure 9 is a bottom view of the elements shown in Figure 8; and

Figure 10 is a section on the section lines 3—3 of Figure 2 looking in the opposite direction to the arrows with the device closed.

In the drawings like reference characters refer to like parts.

In the drawings I have illustrated my improved light support and have shown the same supported from the supporting rod 10 which is clamped to the desk or table 11 by means of an ordinary clamp 12.

It is understood that any other suitable means for supporting my light support may also be used such as a bracket secured to a wall or a socket secured to the top of a desk or any other suitable means whatsoever.

In the form shown the bar 10 has secured upon the top thereof a knob 13 which limits the upward movement of the supporting plate 14. The knob 13 of course is screw threaded upon the bar 10 and may be easily removed if it is desired to remove the light support from the bar 10.

The improved supporting plate is constructed as follows:

The supporting face 15 of the plate 14 extends radially from the bar 10 and the outer portion of the same terminates in a semi-circular portion 16. The face 15 has a flange 17 at right angles thereto at the inner portion thereof extending parallel to the bar 10 and the flange 17 has a flange 18 at right angles to the flange 17 which also extends parallel to the bar 10. Upon the flange 18 at the top thereof is provided an ear 19 at right angles to the flange 18 and at the bottom of the flange 18 is provided an ear 20 also at right angles to the flange 18 and projecting in the same direction as the ear 19. The ears 19 and 20 are provided with apertures 21 which are slightly larger in diameter than the diameter of the bar 10 so that the plate 14 slides loosely upon the bar 10. An important feature is the fact that the ears 19 and 20 are only connected to the flange 18 and are free from the flange 17 as particularly shown in Figure 7 of the drawings. It is by this construction that resiliency is provided in the holding plate which is of importance when considered with the latch mechanism now to be described.

Projecting downwardly from the bottom portion of the face 15 adjacent the inner portion of the same is a lug 22 shown particularly in Figure 5. Pivoted to this lug by means of the pivot 23 is a latch 24 which has an operating handle 25 and an engaging face for the rod 10 at 26. The engaging face is provided with an arc shaped edge 27 so that it may engage the circular bar 10 throughout an arc of approximately 120 degrees. The engaging face of the latch 24 is positioned at a sufficient distance from the pivot 23 upon the lug 22 so that when it contacts with the bar 10 and is moved into clamping position it will take up the slack provided in the apertures 21 and will also force the face 15 a sufficient distance away from the bar 10 so as to flex the flange 17 away from the flange 18. By this construction the latch 24 grasps the rod with a spring tension and although it will prevent longitudinal movement of the plate 14 along the bar 10 it will nevertheless permit rotary movement about the bar 10. This feature is extremely important since in devices heretofore it has always been necessary to rigidly fix the support upon a bar or if rotary movement is provided it is impossible to at the same time permit longitudinal movement along the bar.

The inner friction pivot of the lazytongs A will now be described:

Upon each side of the plate 15 I place cork washers 28 and upon each side of the cork washers are the terminating legs 29 of the lazytongs A and each of these legs 29 terminates in a disk 30 having a raised central portion 31.

By this construction the disks 30 will clamp the washers 28 throughout the outer peripheries of the same and the raised portions 31 provide proper resiliency for holding purposes. The plate 15 and the disks 30 have alined apertures 32 as shown particularly in Figure 6 through which passes a bolt 33 having a head 34 upon one side and a wing nut 35 upon the other. The bolt 34 is slotted at 36 and the disk 30 adjacent the wing nut 35 is provided with a key 37 which fits into this slot 36 so as to prevent movement of the disk 30 with relation to the bolt 33.

The legs 29 are provided with eyelets 38 which pivotally secure the remaining legs B of the lazytongs. The legs B at their ends and at their centers are secured by the same type of eyelet as shown particularly in Figure 4 and they are spaced by means of a washer 39. As shown in Figure 1 the cord 40 carrying the circuits for the light can be threaded through these various eyelets 38 in a well known manner.

Upon the legs 29 there is provided at the inward ends of the same lugs 41 which have flanges 42 bent at right angles thereto and extending towards each other which serve as stops to limit the inward movement of the legs 29 and thereby also limits the inward or collapsing movement of the remaining legs of the lazytongs.

Upon the outer end of the lazytongs I provide my new and improved universal joint indicated generally at C. The terminating legs of the lazytongs are indicated in Figure 2 at 43 and 44. The leg 44 has secured to it by means of the rivet 45 a lug 47 which carries a disk 46 which is offset slightly from the lug 47.

Secured to the disk 46 by means of the bolt 48 and the wing nut 49 is a double disk member 50 having disks 51 and 52 arranged at right angles to one another and which have connecting the same strengthening flanges 53 as shown particularly in Figures 2 and 3 of the drawings. The disks 51 and 52 have offset central portions 54 similar to the offset portions 31 previously described.

Secured to the disk 52 by means of a bolt 55 and wing nut 56 is another disk 57 which carries at right angles thereto a flange 58 having the strengthening webs 59 and the light socket indicated generally at D is connected to the flange 58 by any suitable means.

Between the disk 46 and the disk 51 and between the disk 52 and the disk 57 are placed cork washers 60 which are similar to the cork washers 28 previously described. It is understood that in place of the cork washers 28 and 60 any other suitable friction washers of any suitable composition may be substituted.

The bolts 48 and 55 are provided with slots 61 which are similar to the slot 36 previously described and into which slots fit keys 62 carried by the disk 52 and key 63 carried by the disk 51.

The legs 43 and 44 are provided with alined apertures 64 and the disk 46 and the disk 51 as well as the washer 60 therebetween have aligned apertures 65. The bolt 48 passes through the apertures 64 and 65 and secures the disks 46 and 51 to the outer end of the lazytongs.

The disks 57 and 52 as well as the washer 60 between these two disks are provided with alined apertures 66 through which the bolt 55 passes.

From applicant's construction it will be noted that the disk 51 can rotate with respect to the disk 46 in a vertical plane while the disk 57 can rotate with respect to the disk 52 in any position in which the disk 52 may be placed with respect to the disk 46. The entire lazytongs may be oscillated about the bar 10 through the connections previously described and the lazytongs may be extended or collapsed as desired and the friction disks 30 with their respective cork washers will hold the lazytongs in any desired position.

In this respect it is pointed out that it is not necessary to loosen the wing nuts throughout my device in order to secure any desired adjustment. The cork washers and the peculiar construction of the disks allows a wide range in the holding of the various elements in adjustment without the necessity of loosening and resetting the various wing nuts and bolts. This is an exceedingly important result secured by my device. At the same time the entire device may be oscillated about the bar 10 and there is sufficient friction to maintain the same in position about the bar 10 and the light support will maintain its position until it is manually moved.

The light socket it will be noted can be arranged in every possible position. The light may be directed backwards, upwards, downwards or in any position that may be desired. In many instances it is desirable to direct the light upwardly under the work that is being done and this can easily be accomplished by my light without the necessity of loosening a single bolt or catch and then resetting the same.

With the light supports now in use generally it is frequently necessary to move the work to the light because the light cannot be easily moved to the work. In such cases with my improved light support it is merely necessary to pull the light over manually to the work and then turn it into any position desired and the various frictional elements throughout my device will hold the light fixed in position.

Some changes may be made in the construction and arrangement of the invention above set forth, without departing from the real purpose and spirit thereof, and it is the intention to cover by the following claims, any modified forms of structure or use of equivalents, which may be reasonably included within their scope.

I claim:

1. A supporting bracket comprising a plate, a flange extending at substantially right angles to said plate, a second flange extending at substantially right angles to said first flange, apertured ears upon said second flange, a bar passing through said apertures in said ears and means carried by said plate to react against said bar for distorting said flanges to resiliently clamp said plate to said bar.

2. A supporting bracket comprising a plate, a flange extending at substantially right angles to said plate, a second flange extending at substantially right angles to said first flange, apertured ears upon said second flange, a bar passing through said apertures in said ears and means carried by said plate to react against said bar for distorting said flanges to resiliently clamp said plate rotatably to said bar.

3. A supporting bracket including a plate, lazytongs having the legs thereof upon one end terminating in disk members which are secured one upon each side of said plate, means for supporting an article upon the other end of said lazytongs and means upon said disk members for limiting the collapsing of said lazytongs.

4. A supporting bracket including a plate, lazytongs having the legs thereof upon one end terminating in disk members which are secured to said plate, means for supporting an article upon the other end of said lazytongs and an abutment upon each disk member which are adapted to cooperate together to limit the collapsing of said lazytongs.

5. A supporting bracket comprising a clamp, lazytongs secured to said clamp, a disk secured to said lazytongs, a double disk member secured frictionally to said first mentioned disk, means for distorting said disks to place the same under spring tension and an article carried by said double disk member.

6. A supporting bracket comprising a clamp, lazytongs secured to said clamp, a disk secured to said lazytongs, a double disk member secured frictionally to said first mentioned disk, another disk secured to said double disk member, means for distorting said disks to place the same under spring tension and a supporting means upon said last mentioned disk.

7. An adjustable article support including a fixed plate, lazy tongs having means at one end for supporting an article, the other end of said lazy tongs terminating in disc members, said disc members being disposed and secured pivotally upon each side of said fixed plate and friction members placed between said disc members and said plate so that said lazytongs may be disposed at an angle with reference to said plate.

WALLACE N. HERROLD.